United States Patent [19]

Hoyle et al.

[11] Patent Number: 5,129,768
[45] Date of Patent: Jul. 14, 1992

[54] SLIDING GROMMET

[75] Inventors: Christopher J. Hoyle, Glenwood; Brian R. Peek, Mokena, both of Ill.

[73] Assignee: Illinois Tool Works Inc., Glenview, Ill.

[21] Appl. No.: 818,077

[22] Filed: Jan. 8, 1992

[51] Int. Cl.⁵ .................. F16B 19/00; F16B 37/04
[52] U.S. Cl. ................... 411/182; 411/508; 411/913
[58] Field of Search ............ 411/177, 182, 508-510, 411/908, 913; 24/297; 403/408.1

[56] References Cited

U.S. PATENT DOCUMENTS

| | | | |
|---|---|---|---|
| 4,865,505 | 9/1989 | Okada | 411/508 X |
| 4,927,306 | 5/1990 | Sato | 411/182 |
| 5,028,190 | 7/1991 | Loughlin, Jr. et al. | 411/182 |

FOREIGN PATENT DOCUMENTS

| | | | |
|---|---|---|---|
| 2921956 | 12/1980 | Fed. Rep. of Germany | 411/508 |
| 2499177 | 8/1982 | France | 411/182 |

Primary Examiner—Neill R. Wilson
Attorney, Agent, or Firm—Thomas W. Buckman; John P. O'Brien

[57] ABSTRACT

A sliding grommet includes a head flange and a shank portion of a unique construction which is capable of absorbing relative positions of an oblong fitting hole in a mounting panel and a throughhole in a mating hole to be attached caused by thermal expansion and contraction. A pair of Y-shaped members are disposed on opposite sides of the shank portion to permit flexing upon insertion, and locking tabs are provided on each leg of the Y-shaped members for retaining freely floating the shank portion in the oblong fitting hole in the mounting panel so as to permit lateral sliding engagement between the upper and lower edges of the fitting hole.

10 Claims, 2 Drawing Sheets

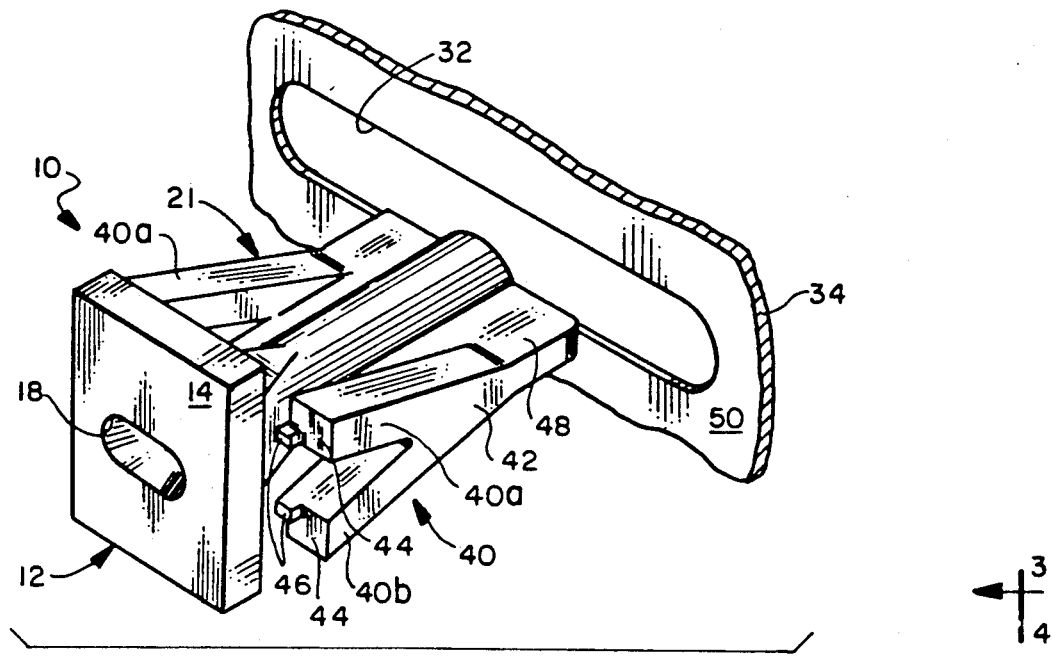

5,129,768

SLIDING GROMMET

BACKGROUND OF THE INVENTION

1. Field of the Invention

This invention relates generally to plastic screw grommets and more particularly, it relates to an improved sliding grommet of the type to be inserted and retained freely floating in a fitting hole in a mounting panel and thereafter to receive a threaded element, such as a screw, for mounting a mating panel having a throughhole to the mounting panel. The sliding grommet is adapted to absorb variations in the relative positions of the fitting hole in the mounting panel and the throughhole in the mating panel caused by thermal expansion and contraction due to temperature changes.

2. Description of the Prior Art

A state-of-the-art search directed to the subject matter of this application uncovered the following patents:

Klump, Jr. U.S. Pat. No. 2,424,757; Takagawa et al U.S. Pat. No. 4,358,234; Kraus U.S. Pat. No. 4,787,795; Okada U.S. Pat. No. 4,865,505; and Sato U.S. Pat. No. 4,927,306.

British Pat. No. 1,139,976.

There is disclosed in U.S. Pat. No. 2,424,757 a self-locking integral bushing which includes a body portion 1 terminating at one end in a circular flange 2 and upwardly extending fingers 3 located between the flange and the opposite end of the body portion. The fingers are provided with a plurality of shoulders 7, 8 and 9 to accommodate the bushing to plates of different thicknesses. As the bushing is pushed through a hole in the plate, the fingers will be forced inwardly until they pass the outer surface of the plate and then snap back so that one of the shoulders will engage the plate and lock the bushing in place.

There is disclosed in U.S. Pat. No. 4,358,234 a part fixing system for fixing the part to the object by the combined use of at least one retaining clip 15 for determining the position of the part relative to the object and a plurality of retaining clips 14 for absorbing possible positional deviation between the stud bolts of the part and the corresponding holes in the object. Each of the retaining clips 14 includes a nut member 17 adapted to be screwed to the bolt and a plurality of deformable engaging pieces 18 extending divergingly from one end of the nut member, and grooves 19 cut in the leading edges of the engaging pieces for resilient engagement with the edges of a fixing hole in the object.

There is taught in U.S. Pat. No. 4,787,795 a push-in fastener which includes an elongated body 3, an enlarged head 5 joined to the upper end of the body and a pair of resilient arms 1 and 2 joined integrally to the body. The arms are located diametrically opposite one another and extend at an angle toward the head. The free end zones of the arms have catch openings or notches 15, 16 which engage the underside of a workpiece opening when the fastener is inserted therein. The body 3 includes cylindrical guide sections 6, 7 which lie opposite each other and are displaced 90° radially from the arms. Upper and lower truncated cone sections 9 and 8 are formed above and below the cylindrical sections.

U.S. Pat. No. 4,865,505 shows a part mounting structure which includes a U-shaped metal leaf spring member 2 for receiving a boss portion 1a of a part 1, and a clip member 3 for receiving the leaf spring member and for engaging a mounting oblong hole 5 of a panel 4. The clip member is formed of a flange 8 and two pairs of engaging portions 10 projecting outwardly from the opposite outer walls 3a on its long side thereof. A pair of elastic engaging legs 13 are formed on the opposite outer walls 3b on the short side of the clip member and project upwardly therefrom. The clip member is easily moved and centered within the oblong hole since the engaging portions 10 and the engaging legs 13 are engaged with the edge of the oblong hole.

U.S. Pat. No. 4,927,306 shows a screw grommet 1 formed of an enlarged head part for abutting against the surface of a mounting panel 11 and a shank 3 for engaging an oblong fitting hole 12 bored in the mounting panel. The shank includes a pair of elastic arms 6 disposed on the opposed walls 3b and extending therefrom at a prescribed angle. Each arm has a stepped underend 6a for elastic engagement with the edge of the fitting hole. If a part 13 to be mounted expands or contracts to induce a variation in the relative positions of the fitting hole 12 bored in the mounting panel and throughhole 14 bored in the part, the screw grommet is capable of absorbing the variations in the hole positions since the shank 3 is allowed to easily slide inside the oblong fitting hole due to the bending in the elastic arms 6 into the empty spaces 7.

Finally, British Pat. No. 1,139,976 describes a two-part fastener comprising a support engaging part A and a retaining pin B. The engaging part A has a body 1 formed with a flange 2 at its one end and resilient wing-like elements 3, 4 disposed on its two opposite sides. The wing-line elements are flexible inwardly to enable the body to be snapped through an apertured support B. An apertured member to be secured is positioned over the support so that its aperture is aligned with the aperture in the support. The retaining pin is inserted axially through these apertures and into the bore in the body 1.

However, none of the prior art uncovered in the search disclosed a sliding grommet having a head flange and a shank portion of a unique construction like that of the present invention which is capable of absorbing relative positions of an oblong fitting hole in a mounting panel and a throughhole in a mating panel to be attached caused by thermal expansion and contraction. This is accomplished by a pair of Y-shaped resilient members disposed on opposite sides of the shank portion to permit flexing upon insertion and by providing locking tabs on each leg of the Y-shaped members for retaining freely floating the shank portion in the oblong fitting hole in the mounting panel so as to permit lateral sliding engagement between the upper and lower edges of the fitting hole. As a result, the grommet after fixation in a mounting panel allows for thermal expansion and contraction of the mating panel due to changes in the ambient temperatures causing variations in the relative lateral positions of the fitting hole and the throughhole.

SUMMARY OF THE INVENTION

Accordingly, it is a general object of the present invention to provide an improved sliding grommet which is relatively simple and economical to manufacture and use.

It is an object of the present invention to provide an improved sliding grommet of the type adapted to be inserted and retained freely floating in a fitting hole in a mounting panel and thereafter to receive a threaded element for mounting a mating panel having a throughhole to the mounting panel.

It is another object of the present invention to provide an improved sliding grommet which is capable of absorbing relative positions of an oblong fitting hole in a mount panel and a throughhole in a mating panel to be attached caused by thermal expansion and contraction.

It is still another object of the present invention to provide an improved sliding grommet which includes a shank portion having a pair of Y-shaped resilient members disposed on opposite sides thereof to permit flexing upon insertion and having locking tabs on each leg of the Y-shaped members for retaining freely floating the shank portion in the oblong fitting hole in the mounting panel.

In accordance with these aims and objectives, the present invention is concerned with the provision of an improved sliding grommet for insertion and being retained freely floating in an oblong fitting hole of a mounting panel for receiving a threaded element so as to mount mating panel having a throughhole to the mounting panel. The sliding grommet includes a head flange and a shank portion. The head flange has a central opening therein and is formed of a front surface and a back surface. The shank portion extends from the back surface of the head flange to a free end. The shank portion includes an upper section having a substantially rectangular cross-section defined by opposed flat walls and a lower section having a cylindrical cross-section extending between the upper section and the free end. The upper section includes shoulders for engaging upper and lower edges of the oblong fitting hole.

The shank portion further includes a pair of Y-shaped members disposed integrally on opposite sides thereof. Each of the Y-shaped members extend substantially from a short distance behind the upper section to the free end. Each of the Y-shaped members is formed of two resilient tapered legs which extend divergingly from its common end towards the head flange. Each of the legs terminates in a front face. Each of the front faces has a locking tab for retaining freely floating the shank portion in the fitting hole so as to permit lateral sliding engagement between the upper and lower edges of the fitting hole. The grommet after fixation in the mounting panel allows for thermal expansion and contraction of the mating panel due to changes in ambient temperatures causing variations in the relative lateral positions of the fitting hole and the throughhole.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a perspective view of a sliding grommet constructed in accordance with the principles of the present invention, prior to insertion into an oblong fitting hole in a mounting panel;

FIG. 2 is a front elevational view of the sliding grommet of FIG. 1;

FIG. 3 is a side view, taken along the lines 3—3 of FIG. 2;

FIG. 4 is a cross-sectional view, taken along the lines 4—4 of FIG. 2;

DESCRIPTION OF THE PREFERRED EMBODIMENT

Figure 5:
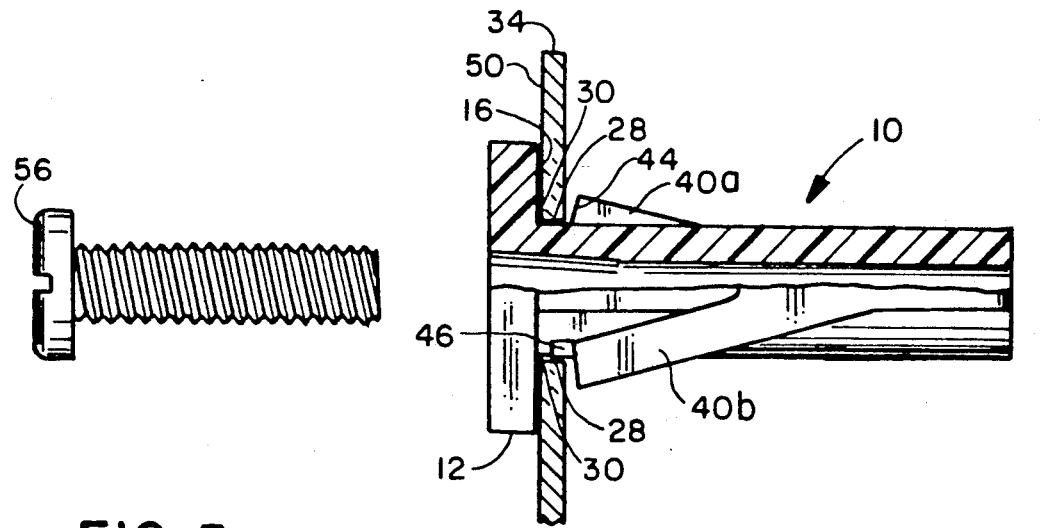
FIG. 5 is a side elevational view of the sliding grommet of FIG. 1 after insertion into the mounting panel.

Referring now in detail to the various views of the drawings, and in particular to FIGS. 1 through 5, there is shown a sliding grommet 10 which is constructed in accordance with the principles of the present invention. The sliding grommet 10 is preferably formed of a unitary structure which is manufactured from a resilient plastic material or the like through a conventional plastic process such as injection molding. The sliding grommet includes a head flange 12 which is of a generally flat rectangular shape. However, it should be apparent to those skilled in the art that the head flange 12 may have a round, square, or any other shape than the rectangular shape illustrated in the drawings.

The head flange 12 has a flat front surface 14 and a flat back surface 16. The head flange 12 also has a generally elliptically-shaped or oblong opening 18 formed through its center. The opening 18 is defined by an inwardly tapered wall portion 20 which form a threaded element receiving bore 22. The tapered wall portion 20 serves as a tapered lead-in to allow for misalignment during insertion of a threaded screw for assembly.

The sliding grommet 10 also includes a shank portion 21 (FIG. 3) formed integrally with the head flange 12 and extends away from the head flange along the axis of the bore 22. The free end 24 of the shank portion is open. The shank portion 21 includes an upper section 26 of a substantially rectangular cross-section defined by opposed flat walls 28 and a lower section 29 having a cylindrical shape extending between the upper section 26 and the free end 24.

The upper section 26 extends axially and outwardly from the back surface 16 of the head flange 12 and includes shoulders 30 for engaging the upper and lower edges of an elongated or oblong fitting hole 32 in a mounting panel 34 and for maintaining the sliding grommet aligned with the fitting hole. The upper section 26 has an inwardly sloping bore 36 which extends from the receiving bore 22 in the head flange to a cylindrical bore 38 formed in the lower section 21.

The shank portion 21 further includes a pair of Y-shaped members 40 disposed integrally on opposed sides thereof to retain the grommet in the mounting panel independent of the retention of the threaded screw. The Y-shaped members 40 extend substantially from a short distance behind the upper section 26 to the free end 24. Each of the Y-shaped members 40 is formed by two resilient tapered prongs or legs 40a, 40b which extend divergingly from its common end 42 towards the head flange 12. Each of the legs 40a, 40b terminates in a front face 44. The front faces 44 are provided with locking tabs 46 adapted for retaining freely floating the shank portion 21 in the fitting hole 32 so as to permit lateral sliding engagement between the upper and lower edges of the fitting hole.

There is provided a reinforcing rib 48 which joins integrally the Y-shaped members 40 to the upper and lower sections 26 and 28 of the shank portion 21. The reinforcing rib 48 serves to limit twisting or rotation of the sliding grommet during insertion of a threaded screw into the bores 22, 36 and 38.

Figure 6:
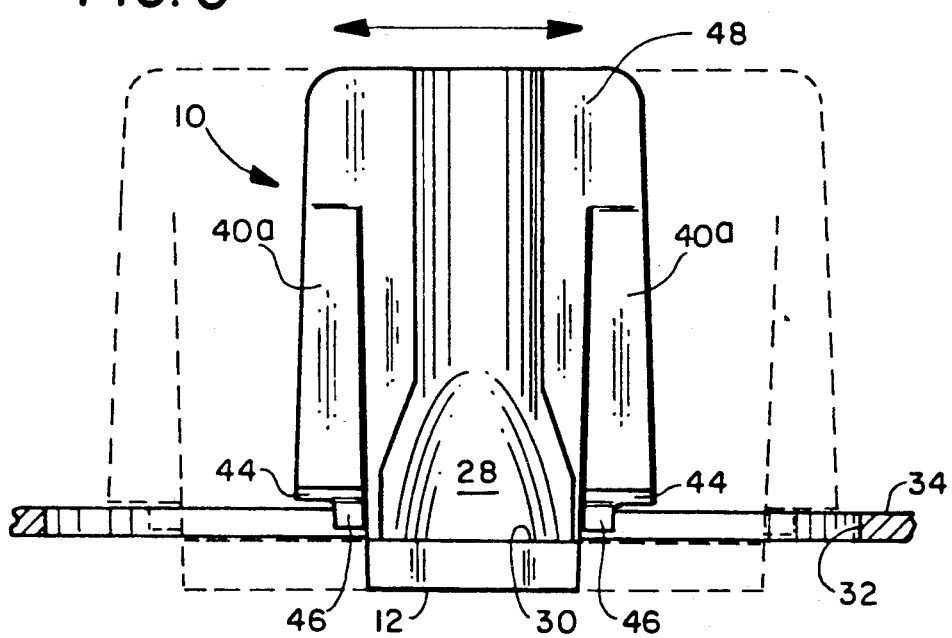
FIG. 6 is a top plan view of the sliding grommet of FIG. 1 being mounted centrally within the oblong fitting hole in the mounting panel, the dotted lines indicating the extreme left and right lateral positions of the sliding grommet.

In order to use the sliding grommet 10, the shank portion 21 is inserted into the oblong fitting hole 32 in the mounting panel 34 (FIG. 1) until the back surface 16 thereof engages against the exposed surface 50 of the panel 34, as shown in FIGS. 5 and 6. As axial pressure is applied to the grommet, the legs 40a, 40b of the Y-shaped members 40 are caused to collapse or flex inwardly to allow the shank portion 21 to pass through the fitting hole 32 and then snap outwardly so that the front faces 44 of the legs 40a, 40b overlie the back surface of the mounting panel 34.

Further, the shoulders 30 will engage the upper and lower edges of the fitting hole and the back surface 16 of the head flange will overlie the exposed surface 50 of the mounting panel 34. In addition, the locking tabs 46 will be lockingly engaged with the upper and lower edges of the fitting hole 32 (one of which is shown in FIG. 5). The locking tabs 46 and the shoulders 30 serve to maintain the sliding grommet aligned in the fitting hole.

A mating panel 52 to be secured is then positioned over the sliding grommet 10 so that the throughhole 54 therein is aligned with the oblong opening 18 in the grommet, and a screw 56 is inserted through the throughhole 54 in the mating panel 52 and into the bore 22 in the grommet. As the screw 56 is helically driven through the grommet, complementary threads are cut in the wall portions 20 of the bore 22. Alternatively, the grommet may already be provided with internal threads. The reinforcing ribs 48 serves to limit the twisting or rotation of the grommet during the time when the screw 52 is being driven down in the bores 22, 36 and 38.

Figure 7:
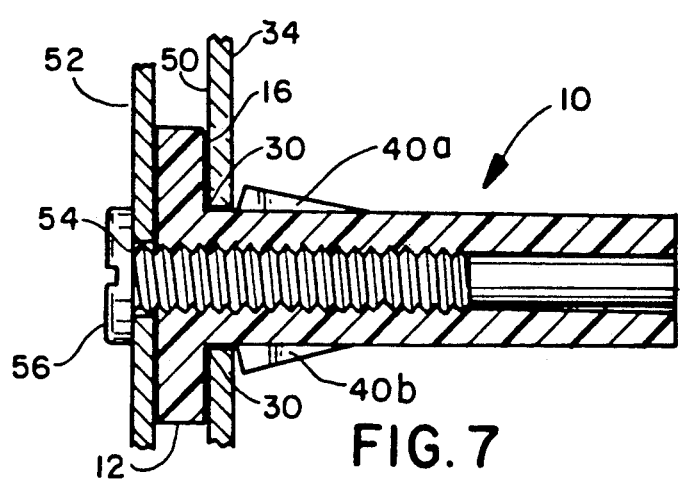
FIG. 7 is an elevational view similar to FIG. 5, but with a screw threaded into the shank portion of the sliding grommet for securing a mating panel having a throughhole.

As the screw 56 progresses through the bore 36 in the upper section 26 of the shank portion 21, the back surface of the mating panel 52 is held securely to the front surface 14 of the head flange 12 of the grommet, as illustrated in FIG. 7.

If the mating panel 52 expands or contracts due to changes in the ambient temperature after fixation of the grommet 10 to the mounting panel 34 so as to cause a variation in the relative positions of the fitting hole 32 and the throughhole 54, this relative variation can be completely absorbed because the locking tabs 46 of the legs 40a, 40b of the grommet allows it to easily slide laterally within the fitting hole 32 proportionally to the misalignment of the fitting hole 32 and the throughhole 54. As shown in FIG. 6, the dotted lines depict the extreme left and extreme right lateral positions of the sliding grommet 10 in the fitting hole 32 of the mounting panel 34.

From the foregoing detailed description, it can thus be seen that the present invention provides an improved sliding grommet having a head flange and a shank portion of a unique construction which is capable of absorbing relative lateral positions of an oblong fitting hole in a mounting panel and a throughhole in a mating panel to be attached caused by thermal expansion and contraction. A pair of Y-shaped resilient members are disposed on opposite sides of the shank portion to permit flexing upon insertion and locking tabs are provided on each leg of the Y-shaped members for retaining freely floating the shank portion in the oblong fitting hole in the mounting panel so as to permit lateral sliding engagement between the upper and lower edges of the fitting hole.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A sliding grommet for insertion and being retained freely floating in an oblong fitting hole of a mounting panel for receiving a threaded element so as to mount a mating panel having a throughhole to the mounting panel, said sliding grommet comprising:

a relatively flat head flange having a central opening therein and being formed of a front surface and a back surface;

a shank portion extending from the back surface of said head flange to a free end, said shank portion including an upper section having a substantially rectangular cross-section defined by opposed flat walls and a lower section having a cylindrical cross-section extending between the upper section and the free end, said upper section including shoulders for engaging upper and lower edges of the oblong fitting hole; and said shank portion further including a pair of Y-shaped members disposed integrally on opposed sides thereof, each of said Y-shaped members extending substantially from a short distance behind the upper section to the free end, each of said Y-shaped members being formed of two resilient tapered legs which extend divergently from its common end towards said head flange, each of said legs terminating in a front face, each of the front faces having a locking tab for retaining freely floating the shank portion in the fitting hole so as to permit lateral sliding engagement between the upper and lower edges of the fitting hole, whereby said grommet after fixation in said mounting panel allows for thermal expansion and contraction of said mating panel due to changes in ambient temperatures causing variations in the relative lateral positions of the fitting hole and the throughhole.

2. A sliding grommet as claimed in claim 1, wherein said central opening in said head flange is defined by an inwardly tapered wall portion which forms a threaded element receiving bore that has a tapered lead-in to allow for misalignment during assembly.

3. A sliding grommet as claimed in claim 2, wherein said central opening has an oblong cross-section.

4. A sliding grommet as claimed in claim 1, wherein said head flange has a substantially rectangular shape.

5. A sliding grommet as claimed in claim 2, further comprising a reinforcing rib which joins integrally said pair of Y-shaped members to said shank portion.

6. A sliding grommet for insertion and being retained freely floating in an oblong fitting hole of a mounting panel for receiving a threaded element so as to mount a mating panel having a throughhole to the mounting panel, said sliding grommet comprising:
- a relatively flat head flange having a central opening therein and being formed of a front surface and a back surface;
- a shank portion extending from the back surface of said head flange to a free end, said shank portion including an upper section and a lower section extending between the upper section and the free end, said upper section including shoulders for engaging upper and lower edges of the oblong fitting hole; and
- said shank portion further including a pair of Y-shape members disposed integrally on opposed sides thereof, each of said Y-shaped members extending substantially from a short distance behind the upper section to the free end, each of said Y-shaped members being formed of two resilient tapered legs which extend divergently from its common end towards said head flange, each of said legs terminating in a front face, each of the front faces having a locking tab for retaining freely floating the shank portion in the fitting hole so as to permit lateral sliding engagement between the upper and lower edges of the fitting hole,
- whereby said grommet after fixation in said mounting panel allows for thermal expansion and contraction of said mating panel due to changes in ambient temperatures causing variations in the relative lateral positions of the fitting hole and the throughhole.

7. A sliding grommet as claimed in claim 6, wherein said central opening in said head flange is defined by an inwardly tapered wall portion which forms a threaded element receiving bore that has a tapered lead-in to allow for misalignment during assembly.

8. A sliding grommet as claimed in claim 7, wherein said central opening has an oblong cross-section.

9. A sliding grommet as claimed in claim 6, wherein said head flange has a substantially rectangular shape.

10. A sliding grommet as claimed in claim 7, further comprising a reinforcing rib which joins integrally said pair of Y-shaped members to said shank portion.